United States Patent Office 3,433,839
Patented Mar. 18, 1969

3,433,839
PROCESS FOR THE PRODUCTION OF A MIXTURE OF ALICYCLIC HYDROXYALDEHYDES
Tatsuo Moroe, Musashino, Akira Komatsu and Takeshi Matsui, Tokyo, and Kuniaki Ueda, Kawasaki, Japan, assignors to Takasago Perfumery Co., Ltd., Tokyo, Japan, a corporation of Japan
No Drawing. Filed May 8, 1967, Ser. No. 636,622
Claims priority, application Japan, May 12, 1966, 41/29,670
U.S. Cl. 260—598      4 Claims
Int. Cl. C07c 47/18; C11b 9/00

ABSTRACT OF THE DISCLOSURE

Myrcene obtained by pyrolysis of β-pinene is used as a starting material. This myrcene is first photo-oxidized to produce a mixture of its hydroperoxides and the resulting mixture is then reduced to produce a mixture of unsaturated alcohols, and the mixture thus obtained is subsequently condensed with a dienophile to obtain a desired mixture of two kinds of alicyclic hydroxyaldehydes respectively represented by the following general formulae:

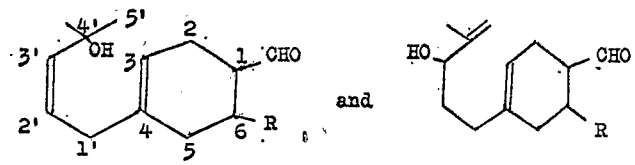

wherein R is a member selected from the group consisting of hydrogen and a methyl group. This mixture is a valuable new perfume material.

BACKGROUND OF THE INVENTION

(1) Field of the invention

The present invention relates to a mixture of alicyclic hydroxyaldehydes respectively represented by the general formulae:

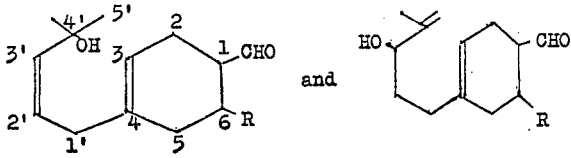

wherein R is a member selected from the class of a hydrogen atom (H) and a methyl group ($CH_3$). This mixture is of important significance as a perfume material, and the present invention also relates to a process for producing such mixture.

(2) Description of the prior art

Perfume materials represented by the general formula

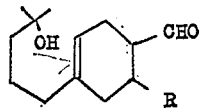

wherein R is a member selected from the group consisting of hydrogen and a methyl group are known, and where R is hydrogen, the compound is 4-(4'-methyl-4'-hydroxy-amyl)-3-cyclohexene-1-carboxyaldehyde, and where R is a methyl group, the compound is 6-methyl-4-(4'-methyl - 4' - hydroxy - amyl) - 3 - cyclohexene - 1 - carboxyaldehyde. These compounds have been reported by International Flavors & Fragrances Inc. of the United States of America and the process for their production was patented in Great Britain under Patent No. 868,850, May 5, 1959. This process resides in reacting with an α,β-unsaturated aldehyde with heating. The myrcenol is synthesized in such a way that sulfite gas is added to myrcene and resulting sulfide gas is removed by hydrolysis.

BRIEF SUMMARY OF THE INVENTION

According to the present invention there is produced a new mixture of 2 alicyclic hydroxyaldehydes represented by the general formulae:

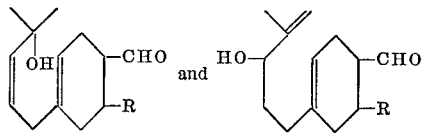

where R is as defined hereinbefore, each of which hydroxyaldehydes has one more double bond than the abovementioned known perfume materials

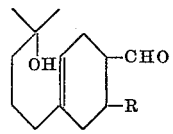

and both of which hydroxyaldehydes contain secondary or tertiary allylic alcohol, and as a result thereof, the fixative properties of such hydroxyaldehydes and perfumes made therewith have been remarkably improved since such fixative properties are important properties in perfume materials.

An object of the present invention is to provide a perfume material having strong fixative properties and which may be derived from cyclohexene compounds.

Another object of the present invention is to obtain a mixture of alicyclic hydroxyaldehydes which will have strong fixative properties and which can be used in myrcene as a starting material.

These objects and other object can be accomplished by a new process which comprises the following steps of:

Photo-oxidizing myrcene which has been obtained by the pyrolysis of β-pinene, with attendant bubbling of oxygen through the reaction system by a known process [R. L. Kenny: Journal of American Chemical Society, 81 (1961)] in an organic solvent in the presence of sensitizer;

Reducing and decomposing the resulting mixture of hydroperoxides, i.e. a mixture of 2-methyl-2-hydroperoxy-6-methylene-3,7-octadiene and 2-methyl-3-hydroperoxy-6-methylene-1,7-octadiene to produce a mixture of unsaturated alcohols, i.e. 2-methyl-6-methylene-3,7-octadiene-2-ol and 2-methyl-6-methylene-1,7-octadiene-3-ol; and Condensing the thus-obtained mixture of unsaturated alcohols with a member selected from the class consisting of acrolein and crotonaldehyde to produce a mixture of alicyclic hydroxyaldehydes which are new compounds and represented by the general formulae:

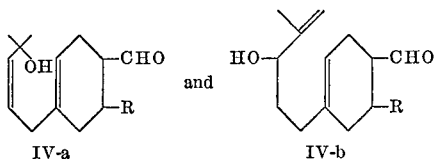

wherein R is a member selected from the class consisting of a hydrogen atom and a methyl group, and where R is hydrogen (H), said hydroxyaldehydes shown in the above-mentioned Formulae IV–a and IV–b respectively correspond to 4 - (4' - methyl-4'-hydroxy-2'-pentenyl)-3-cyclohexene - 1 - carboxyaldehyde and 4-(4'-methyl - 3' - hydroxy - 4' - pentenyl) - 3 - cyclohexene - 1 - carboxyaldehyde, and where R is a methyl group (CH₃), said hydroxyaldehydes shown in the above Formulae IV–a and IV–b respectively correspond to 4-(4'-methyl-4'-hydroxy - 2' - pentenyl) - 6 - methyl - 3 - cyclohexene - 1 - carboxyaldehyde and 4 - (4' - methyl - 3' - hydroxy - 4' - pentenyl)-6-methyl-3-cyclohexene-1-carboxyaldehyde, the ratio or proportion of IV–a to IV–b being approximately 40 to 50%:60 to 50%.

DETAILED DESCRIPTION INCLUDING PREFERRED EMBODIMENTS

The mixture of alicyclic hydroxyaldehydes represented by the above Formulae IV–a and IV–b possesses a durable floral note and is a valuable material as a starting material for compounding perfume, particularly cosmetic and soap perfumes.

The above indicated reaction is shown as follows:

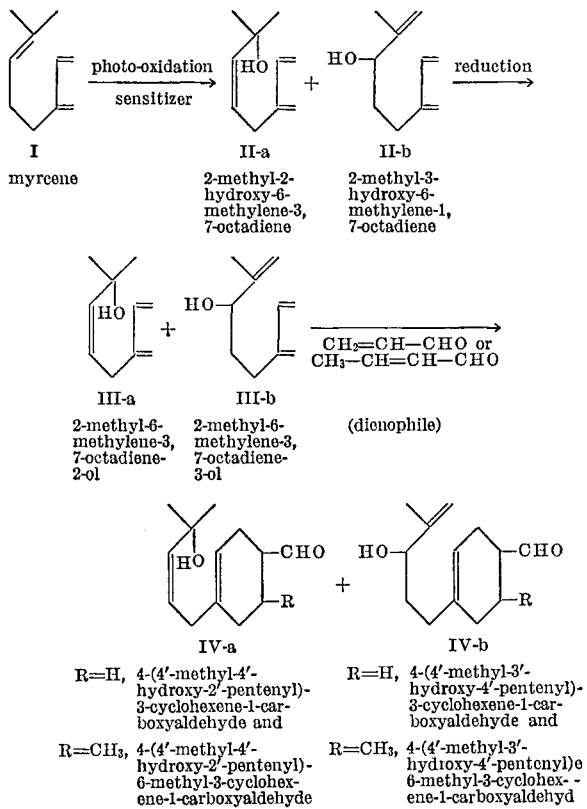

In the present invention, the photo-oxidation reaction is carried out using alcohols as the organic solvent and when methanol is used as such solvent the highest yield is obtained and the reaction is also fast. As a sensitizer there may be used, for instance, Rose Bengal, Eosing, Erythrosin B and Methylene Blue, and when using Rose Bengal, better efficiency is obtained. Light rays having a wave length longer than 3000 A. are used for a source of irradiated light. Light rays having wave lengths shorter than 3000 A. are not adequate because they give rise to secondary reactions, such as polymerization and the like. Pyrex equipment is preferably used. Effective wave lengths will vary depending on the sensitizer, but the effective wave lengths are in the range of approximately 3000 to 5000 A., and it is preferable to use a high pressure mercury arc lamp or xenon lamp as a source of the light. It is preferably to effect the photo-oxidation reaction at a temperature below 30° C. because higher irradiation temperatures will readily cause the hydroperoxides (III–a and III–b) produced by the photo-oxidation to resinify, and it is also better to carry out the said photo-oxidation at 20 to 30° C. from a economical point of view. The oxygen bubbling velocity and the photo-oxidation time are dependent on the wattage of the light source and the charged quantity of myrcene when a light source which is a high pressure mercury lamp of 450 watts is used for 100 g. of myrcene in a 10 to 20% methanol solution an oxygen bubbling velocity of 100 to 300 ml./min. is optimum, in which case the unreacted myrcene becomes less than 5% in 8 hours of irradiation time. However, since the yield of polymerization product increases when the irradiation time is lengthened, it is economical to stop the reaction after an irradiation period of 3 to 5 hours and recover 30 to 40% of the unreacted myrcene. Further, for that length of time, it is preferred that the quantity of the sensitizer to be 3 to 5 g. when Rose Bengal is used as the sensitizer. If it be less than this quantity, the reaction velocity decreases. If it should be more than that quantity, there is no change in the yield and the velocity.

In the reduction and decomposition of the solution irradiated, it is preferable to use an aqueous sodium sulfite solution as a reducing agent. Since the hydroperoxides (II–a and II–b) and the unsaturated alcohols (III–a and III–b) are conjugated dienes, these compounds are extremely unstable in acid and alkali media. Consequently, it is preferable to use a 10 to 20% aqueous solution of sodium sulfite ($Na_2SO_3$) which is weakly basic. In that procedure, a photo-oxidized solution of myrcene is dropped onto a slight excess of a 10 to 20% aqueous sodium sulfite solution and after dropping, the reaction may be effected while continuing stirring at 30 to 35° C. for 3 to 5 hours. Subsequently, the solvent (methanol) is recovered by distilling the reduced solution, and a mixture of unsaturated alcohols (III–a and III–b) is extracted by adding an ether to the residue and after washing, the mixture of unsaturated alcohols is obtained by effecting concentration distillation. The proportion of compound shown by III–a to the compound shown by III–b is about 40 to 50%. The mixture of unsaturated alcohols (III–a and III–b) thus obtained is then addition-condensed with acrolein or crotonaldehyde which are dienophiles, at which time it is preferable to use the dienophile in an amount which is 1.2 to 2.0 times the equivalent of the unsaturated alcohol. In such procedures, it is preferred to carry out the above addition condensation in a nitrogen substituted autoclave, to which a small amount of antioxidant has been added, such as hydroquinone, butyl hydroxyanisole or butyl hydroxytoluene, under temperature conditions of 100 to 150° C. and for a period of 3 to 6 hours. If the reaction temperature is too high or the reaction time is too long, the yield of polymerization product increases. After the reaction, the reaction mixture is steam-distilled once and the residue is extracted with benzene and after washing and distilling the product, there is obtained a mixture of IV–a and IV–b, which is a colorless and viscous liquid, in which the proportion of IV–a to IV–b is about 40 to 50%: 60 to 50%.

This invention is further described in the following examples which are illustrative but not limitative thereof.

EXAMPLE 1

Oxygen was introduced into a solution of 54 g. of myrcene (90% purity) and 5 g. of Rose Bengal in 550 ml. of methanol with an oxygen bubbling velocity of 300 ml./min. and the system was thereafter irradiated for 8 hours with a high pressure arc lamp, using a Pyrex filter, during which time the temperature of the reaction solution was kept at 15 to 20° C. The methanol solution of hydro-peroxides thus obtained was dropped onto a solution of 100 g. $Na_2SO_3$ in 600 ml. water and stirring was continued at 45 to 50° C. for 3 hours and the system was extracted with benzene. After washing, the extract was distilled under reduced pressure and thus there was obtained a mixture of 2-methyl-6-methylene-3,7-octadiene-2-ol (III–a) and 2-methyl-6-methylene-1,7-octadiene-3-ol (III–b) wherein the proportion of III–a to III–b was 45%:55% according to chromatographic analysis. The yield was 60.9 g. and the product obtained had a floral note. The mixture had the following properties:

Boiling point _____ 58 to 60° C./0.35 mm. Hg
Refractive index ($n_D^{20}$) _____ 1.4879
Specific gravity ($d_{25}^{25}$) _____ 0.8935

Further, 200 g. of such mixture of III–a and III–b and 110 g. of acrolein were charged into an autoclave and the headspace in the charged autoclave was filled with nitrogen and the reaction was carried out at 130 to 140° C. for 4 hours. The reaction product was steam-distilled once to distill off the excess acrolein and after being extracted with benzene, the extract was washed with water and then distilled. Thus, a mixture of 4-(4'-methyl-4'-hydroxy-2'-pentenyl)-3-cyclohexene-1-carboxy-aldehyde (IV–a, R=H) and 4-(4'-methyl-3'-hydroxy-4'-pentenyl)-3-cyclohexene-1-carboxyaldehyde (IV–b, R=H) was obtained. According to chromatographic analysis, the proportion of (IV–a, R=H) to (IV–b, R=H) was 45%:55%. The yield was 170 g. The mixture had the following properties:

Boiling point, ° C./0.6 mm. Hg _____ 124–133
Refractive index ($n_D^{20}$) _____ 1.5172
Specific gravity ($d_{25}^{25}$) _____ 1.035

EXAMPLE 2

100 g. of a mixture of unsaturated alcohols (III–a and III–b) obtained by the process described in Example 1; 70 g. of crotonaldehyde and 2 g. of hydroquinone were charged in an autoclave and the headspace in the charged autoclave was filled with nitrogen. These substances were reacted at 140 to 150° C. for 5 hours, and the reaction product was steam-distilled once and then the excess crotonaldehyde was distilled off, after which the residue was extracted with benzene. The extract thus obtained was distilled under reduced pressure to produce a mixture of 4-(4'-methyl-4'-hydroxy-2'-pentenyl)-6-methyl-3-cyclohexene-1-carboxyaldehyde (IV–a, R=CH₃)

and 4-(4'-methyl-3'-hydroxy-4'-pentenyl)-6-methyl-3-cyclo-hexene-1-carboxyaldehyde (IV–b, R=CH₃). The yield was 80.5 g. The mixture thus obtained had a floral note and had the following properties:

Boiling point, ° C./0.25 mm. Hg _____ 131–136
Refractive index ($n_D^{20}$) _____ 1.5047
Specific gravity ($d_{25}^{25}$) _____ 1.0390

What we claim is:
1. A process for producing a mixture of alicyclic hydroxyaldehydes which comprises
photo-oxidizing myrcene to produce a mixture of its hydroperoxides,
reducing the resulting mixture to produce a mixture of 2-methyl-6-methylene-3,7-octadiene-2-ol and 2-methyl-6-methylene-1,7-octadiene-3-ol and
reacting the thus obtained mixture with a dienophile selected from the group consisting of acrolein and crotonaldehyde at 100 to 150° C. for 3 to 6 hours to produce at least one mixture of alicyclic hydroxyaldehydes selected from the group consisting of,
where said dienophile is acrolein,
4 - (4' - methyl - 4' - hydroxy - 2' - pentenyl) - 3-cyclohexene-1-carboxyaldehyde and 4-(4'-methyl - 3' - hydroxy - 4' - pentenyl) - 3 - cyclohexene-1-carboxyaldehyde, and
where said dienophile is crotonaldehyde,
4 - (4' - methyl - 4' - hydroxy - 2' - pentenyl) - 6-methyl-3-cyclohexene-1-carboxyaldehyde and 4-(4' - methyl - 3' - hydroxy - 4' - pentenyl) - 6-methyl-3-cyclohexene-1-carboxyaldehyde.

2. A process as in claim 1 wherein the dienophile is acrolein.

3. A process as in claim 1 wherein in the alicyclic hydroxyaldehyde mixture produced the proportion of the 4'-hydroxy-2'-pentenyl derivative to the 3'-hydroxy-4'-pentenyl dervative is within the range of 40 to 50:60 to 50%

4. A process as in claim 1 wherein the dienophile is crotonaldehyde.

References Cited
UNITED STATES PATENTS 1,944,732  1/1934  Diels et al. _____ 260—598
2,947,780  8/1960  Teegarden _____ 260—598 XR BERNARD HELFIN, *Primary Examiner.*

U.S. Cl. X.R.

204—158; 252—522